US012788646B2

(12) United States Patent
McIntosh et al.

(10) Patent No.: US 12,788,646 B2
(45) Date of Patent: Nov. 10, 2026

(54) WHEELCHAIR FOR AN INTERNAL CABIN OF AN AIRCRAFT

(71) Applicant: The Boeing Company, Arlington, VA (US)

(72) Inventors: Darren Carl McIntosh, Mukilteo, WA (US); Christopher B. Singleton, Bothell, WA (US)

(73) Assignee: The Boeing Company, Arlington, VA (US)

( * ) Notice: Subject to any disclaimer, the term of this patent is extended or adjusted under 35 U.S.C. 154(b) by 182 days.

(21) Appl. No.: 18/820,487

(22) Filed: Aug. 30, 2024

(65) Prior Publication Data

US 2026/0060857 A1 Mar. 5, 2026

(51) Int. Cl.

| | |
|---|---|
| ***A61G 5/10*** | (2006.01) |
| ***A61G 5/08*** | (2006.01) |
| ***B64D 11/00*** | (2006.01) |
| ***B64D 11/04*** | (2006.01) |

(52) U.S. Cl.

CPC ............. *A61G 5/10* (2013.01); *A61G 5/0866* (2016.11); *B64D 11/0007* (2013.01)

(58) Field of Classification Search

CPC .......... A61G 5/10; A61G 5/0866; A61G 5/08; B64D 11/0007; B64D 11/04; B64D 11/0627

See application file for complete search history.

(56) References Cited

U.S. PATENT DOCUMENTS

| | | | | |
|---|---|---|---|---|
| 4,678,202 | A * | 7/1987 | Jensen | B64D 11/0698 280/47.4 |
| 6,202,722 | B1 * | 3/2001 | Crocker | A61G 5/0883 280/304.5 |
| 9,073,471 | B1 * | 7/2015 | McIntosh | B65F 1/141 |
| 9,180,969 | B2 * | 11/2015 | Kunze | B64D 11/0649 |
| 9,725,174 | B2 * | 8/2017 | Seibt | B64D 11/02 |
| 12,030,637 | B2 | 7/2024 | McIntosh et al. | |
| 12,144,767 | B2 * | 11/2024 | Joyce | A61G 5/1062 |
| 12,257,197 | B2 * | 3/2025 | Pitt | A61G 5/1059 |
| 12,534,203 | B2 * | 1/2026 | Moe | A61G 3/0808 |
| 2012/0292953 | A1 | 11/2012 | Kunze | |
| 2021/0338501 | A1 | 11/2021 | Joyce | |
| 2022/0087885 | A1 | 3/2022 | Pitt | |

FOREIGN PATENT DOCUMENTS

| | | |
|---|---|---|
| EP | 2930105 | 2/2018 |

OTHER PUBLICATIONS

Extended European Search Report for EP 25187417.8-1009, dated Sep. 17, 2025.

(Continued)

*Primary Examiner* — John D Walters

(74) *Attorney, Agent, or Firm* — Joseph M. Butscher; Carroll, Hoette & Butscher, LLC

(57) ABSTRACT

A system and a method include a wheelchair, and a cart housing removably coupled to the wheelchair. The cart housing is configured to be selectively secured to and removed from the wheelchair. The system is operable as a galley cart when the cart housing is secured to the wheelchair. The system is operable as transfer chair when the cart housing is removed from the wheelchair.

21 Claims, 16 Drawing Sheets

(56) References Cited

OTHER PUBLICATIONS

Melrose Philip et al: “Airline Wheelchairs”, Apr. 1, 2017 (Apr. 1, 2017), pp. 1-7, XP093309805, Retrieved from the Internet: URL:https://melrosewheelchairs.co.nz/brochures/airline-wheelchairs.pdf [retrieved on Sep. 8, 2025].

“Trolley based electric wheelchair for aircraft with integrated emergency stretcher”, Research Disclosure Journal, Questel, vol. 723, No. 35 Jun. 1, 2024 (Jun. 1, 2024), XP007152836, ISSN: 0374-4353 Retrieved from the Internet: URL:https://www.researchdisclosure.com/dat abase/RD723035 [retrieved on Jun. 3, 2024].

* cited by examiner

WHEELCHAIR FOR AN INTERNAL CABIN OF AN AIRCRAFT

FIELD OF THE DISCLOSURE

Examples of the present disclosure generally relate to a wheelchair for use within an internal cabin of an aircraft, such as a commercial aircraft.

BACKGROUND OF THE DISCLOSURE

Vehicles such as commercial aircraft are used to transport passengers between various locations. A typical aircraft includes an internal cabin having seats for passengers, one or more galleys, and one or more lavatories.

A galley within an internal cabin of a commercial aircraft includes cart compartments for retaining galley carts. A cart compartment includes a dedicated housing having walls and an upper surface, such as a ledge or countertop. A galley cart can be moved into and out of the compartment.

Wheelchairs can be used to assist individuals with limited or reduced mobility within an internal cabin of an aircraft. For example, an individual can be moved on a wheelchair or specialized transfer seat within the internal cabin. These wheelchairs can be referred to as onboard wheelchairs or transfer wheelchairs.

However, space is limited within an internal cabin of an aircraft. As can be appreciated, a wheelchair or transfer seat occupies space within the internal cabin.

SUMMARY OF THE DISCLOSURE

A need exists for a system and a method that increase usable space within an internal cabin of a vehicle. Further, a need exists for a system and a method for disposing a wheelchair within an internal cabin, while also reducing space occupied by the wheelchair within the internal cabin.

With those needs in mind, certain examples of the present disclosure provide a system including a wheelchair, and a cart housing removably coupled to the wheelchair. The cart housing is configured to be selectively secured to and removed from the wheelchair. The system is operable as a galley cart when the cart housing is secured to the wheelchair. The system is operable as transfer chair when the cart housing is removed from the wheelchair.

In at least one example, the cart housing secured to the wheelchair is configured to be stored within a cart compartment of a galley within an internal cabin of a vehicle.

In at least one example, the wheelchair includes a platform, wheels downwardly extending from the platform, a height adjuster supported on the platform opposite from the wheels, and a seat secured to the height adjuster. In at least one example, the height adjuster includes one or more of a scissor jack, a hydraulic bottle jack, or a motor. The height adjuster is configured to be moved between a collapsed position, in which the seat is at a lowest level, and a fully extended position, in which the seat is at a highest level. In at least one example, the seat tilts back when the height adjuster moves from the collapsed position toward and into the fully extended position.

The wheelchair can also include a brake pedal operatively coupled to one or more of the wheels, and a release pedal operatively coupled to the brake pedal or the one or more of the wheels.

In at least one example, the wheels are moveable between different wheelbases. As a further example, the wheels are coupled to the platform by one or more springs, and/or an energy storage device (such as one or more gas struts).

The height adjuster can be operable to move the seat above a level of armrests of passenger seats within an internal cabin of a vehicle.

The cart housing is configured to retain one or more of beverages, food items, or trash.

In at least one example, the wheelchair includes a seatback pivotally coupled to a seat base. The seatback is moveable between an upright position, and a downward folded position. The seatback is folded over the seat base in the downward folded position. The cart housing is configured to be secured to a rear surface of the seatback in the downward folded position.

One or more armrests can be moveably coupled to the seatback. One or more handles can be moveably coupled to the seatback. The system can also include one or more footrests. For example, the one or more footrests can be moveably coupled to the seat base.

In at least one example, one or more latches are configured to removably secure the cart housing to the wheelchair.

In at least one example, the cart housing secured to the wheelchair is sized and shaped as a half size galley cart.

The cart housing can include a moveable stand secured to a lower surface.

Certain examples of the present disclosure provide a method including removably coupling the cart housing to the wheelchair; operating the system as a galley cart when the cart housing is secured to the wheelchair; and operating the system as transfer chair when the cart housing is removed from the wheelchair.

Certain examples of the present disclosure provide a vehicle including an internal cabin including a galley. A cart compartment is within the galley. The system having the cart housing secured to the wheelchair is stored within the cart compartment of the galley.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word “a” or “an” should be understood as not necessarily excluding the plural of the elements or steps. Further, references to “one embodiment” are not intended to be interpreted as excluding the existence of additional embodiments that also incorporate the recited features. Moreover, unless explicitly stated to the contrary, embodiments “comprising” or “having” an element or a plurality of elements having a particular condition can include additional elements not having that condition.

Figure 1:
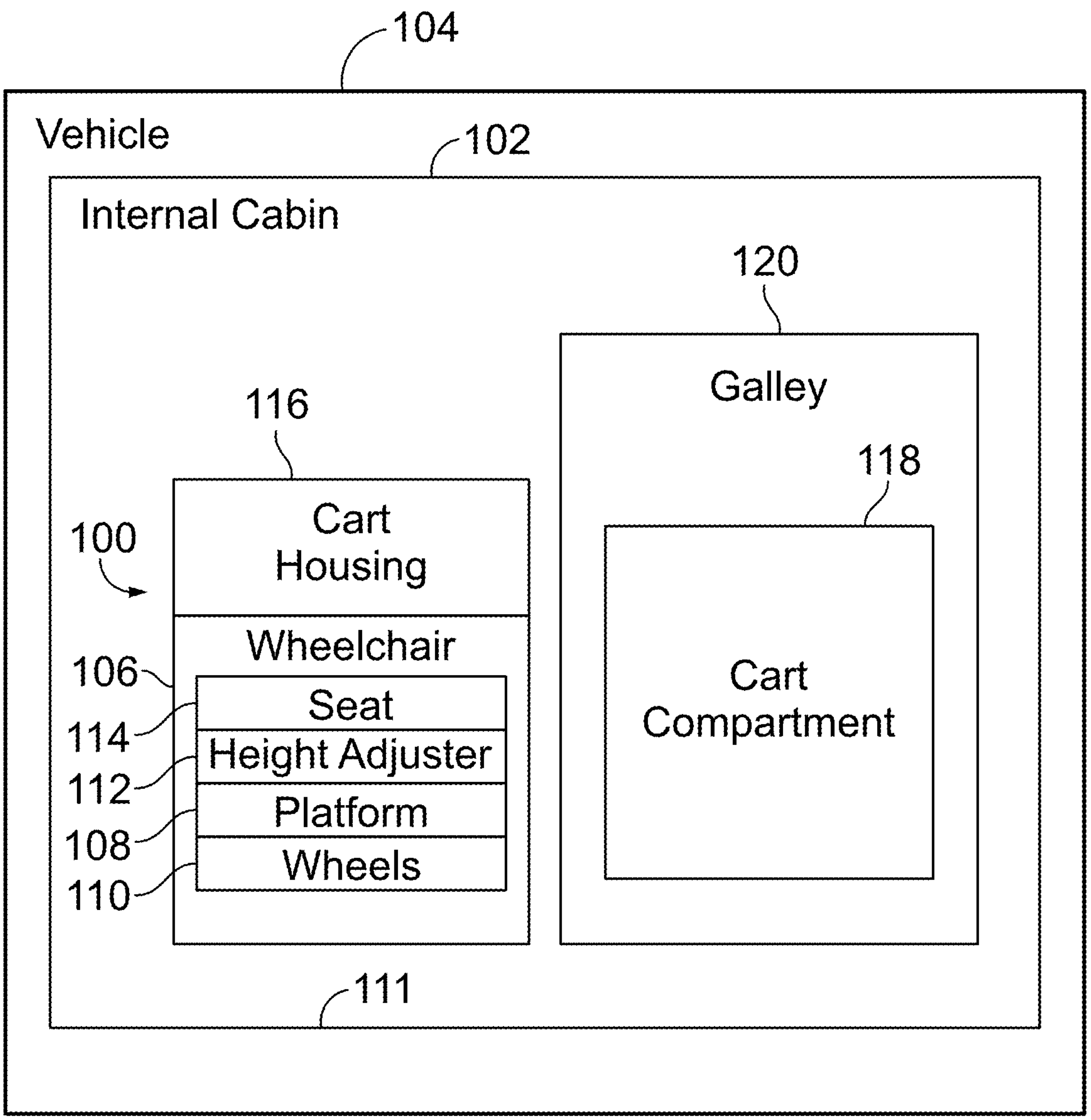
FIG. 1 illustrates a block diagram of a system for use within an internal cabin of a vehicle, according to an example of the present disclosure.

FIG. 1 illustrates a block diagram of a system 100 for use within an internal cabin 102 of a vehicle 104, according to an example of the present disclosure. In at least one example, the vehicle 104 is an aircraft, such as a commercial aircraft. As another example, the vehicle 104 can be a land-based vehicle, such as a bus, train car, or the like, a water-based vehicle, or a spacecraft.

The system 100 includes a wheelchair 106, which includes a platform 108. Wheels 110 downwardly extend from the platform 108 and are configured to rollingly support the wheelchair 106 on a floor 111 of the internal cabin 102. A height adjuster 112 is supported on the platform 108 opposite from the wheels 110. In at least one example, the height adjuster 112 includes a scissor jack, which can be operated with a hand crank, a foot pedal, or the like. As another example, the height adjuster 112 includes a hydraulic bottle jack, which can be operated with a foot pedal. As another example, the height adjuster 112 includes a motor, such as an electric motor, operatively coupled to one or more arms, pistons, bellows, and/or the like. A seat 114 is secured to the height adjuster 112.

In at least one example, the wheelchair 106 is configured as an onboard or transfer wheeled chair for use within an internal cabin of an aircraft. For example, the wheelchair 106 is sized and shaped to pass within narrow aisled and tight confines of an internal cabin of an aircraft.

In operation, the wheelchair 106 is configured to be moved within the internal cabin 102, such as by an attendant pushing the wheelchair 106 with an individual on the seat 114. The height adjuster 112 is configured to be moved between a collapsed position, in which the seat 114 is at a lowest level, a fully extended position, in which the seat 114 is at a highest level, and all levels therebetween.

In at least one example, the system 100 also includes a cart housing 116, which includes one or more internal chambers configured to retain beverages, food items, trash, and/or the like. The cart housing 116 is removably coupled to the wheelchair 106. That is, the cart housing 116 is selectively secured to and removed from the wheelchair 106. As an example, the seat 114 includes a seatback, which is configured to be pivoted between an upright position, in which an individual can be seated on the seat 114, and downward folded position, in which the seatback is folded over a seat base, such as a squab (which can include a seat pan and a cushion secured to the seat pan). In the downward folded position, an individual is unable to sit on the seat base. In the downward folded position, the seatback provides a platform for securing the cart housing 116 onto the wheelchair 106. For example, the cart housing 116 is supported directly on a rear surface of the seatback in the downward folded position, and secured thereon with one or more latches.

When the cart housing 116 is secured to the wheelchair 106, the system 100 can be used as a galley cart within the internal cabin 102 of the vehicle 104. For example, the cart housing 116 is supported on the wheelchair 106, and can be moved within the internal cabin on the wheels 110. The cart housing 116 retains beverages and food items, which can be delivered to individuals within the internal cabin 102. The system 100 having the cart housing 116 secured to the wheelchair 106 can be sized and shaped the same as a standard-sized galley cart. In this manner, the system 100 can be removably retained within a cart compartment 118 of a galley 120 within the internal cabin 102.

Alternatively, the system 100 may not include the cart housing 116. In at least one example, the system 100 may include the wheelchair 106 without the cart housing 116 removably securable to the wheelchair 106.

Figure 2:
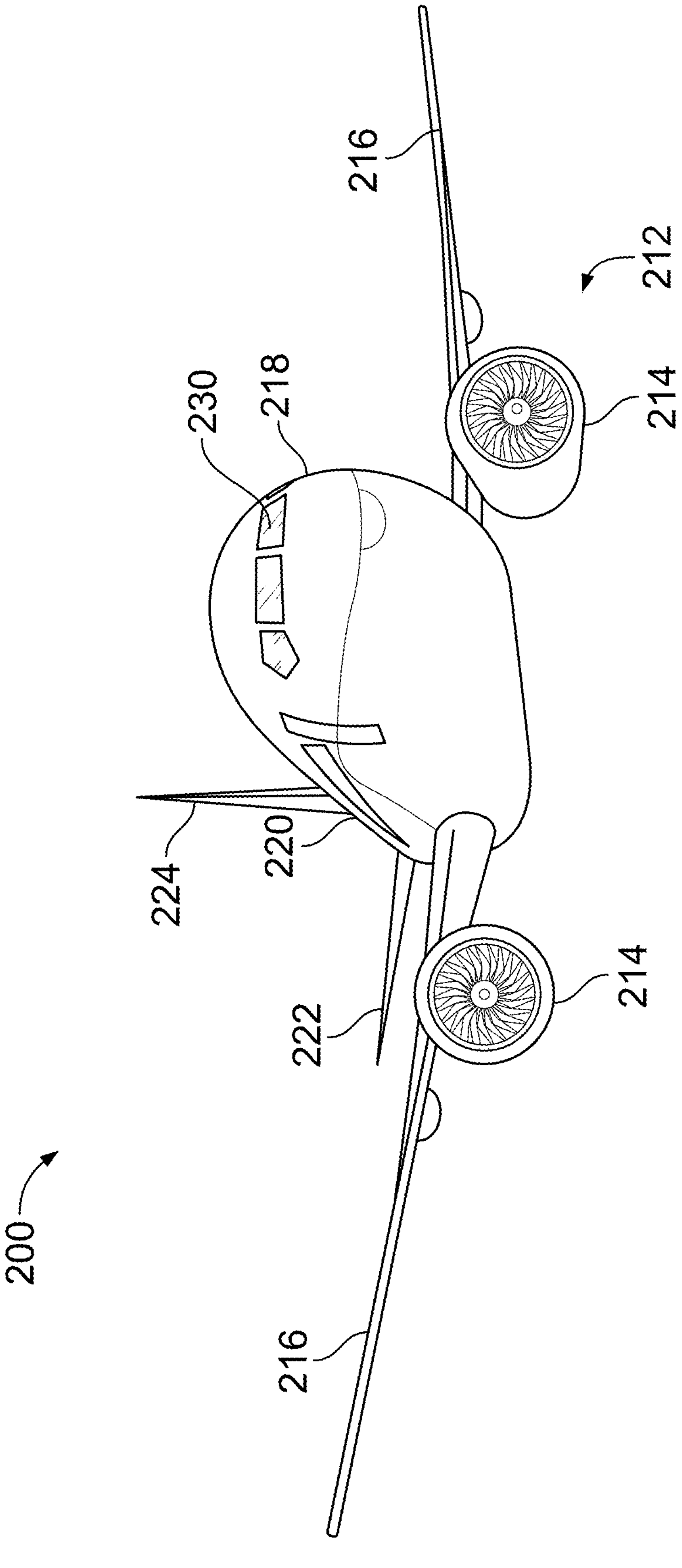
FIG. 2 illustrates a perspective front view of an aircraft, according to an example of the present disclosure.

FIG. 2 illustrates a perspective front view of an aircraft 200, according to an example of the present disclosure. The aircraft 200 is an example of the vehicle 104 shown in FIG. 1. The aircraft 200 includes a propulsion system 212 that includes engines 214, for example. Optionally, the propulsion system 212 may include more engines 214 than shown. The engines 214 are carried by wings 216 of the aircraft 200. In other examples, the engines 214 may be carried by a fuselage 218 and/or an empennage 220. The empennage 220 may also support horizontal stabilizers 222 and a vertical stabilizer 224.

The fuselage 218 of the aircraft 200 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. As described herein, the aircraft 200 includes a system 100 as shown and described herein.

Alternatively, instead of an aircraft, the system and method as described herein can be used with various other vehicles, such as automobiles, buses, locomotives and train cars, watercraft, spacecraft, and the like.

Figure 3:
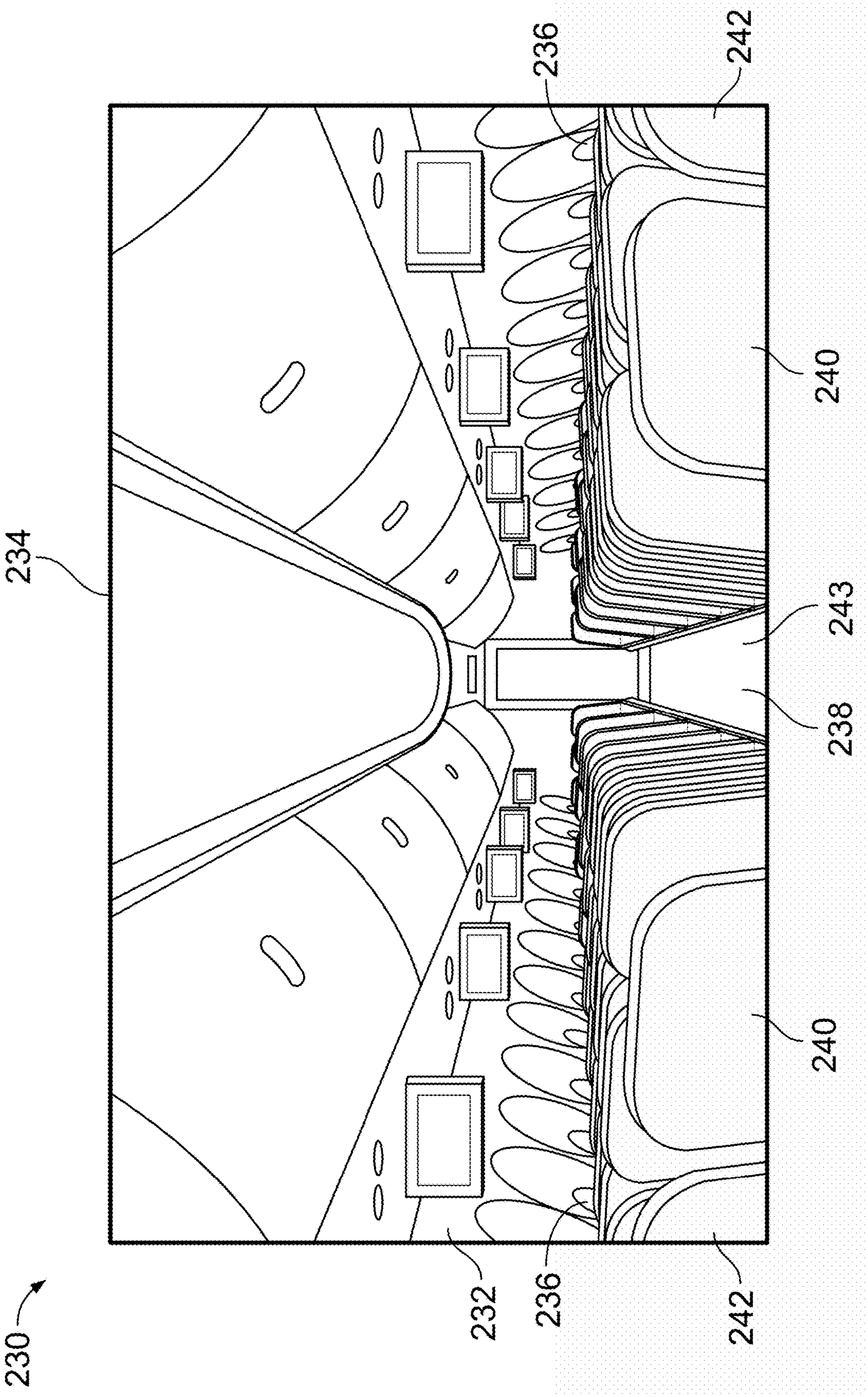
FIG. 3 illustrates a perspective interior view of an internal cabin of an aircraft, according to an example of the present disclosure.

FIG. 3 illustrates a perspective interior view of an internal cabin 230 of an aircraft, according to an example of the present disclosure. The internal cabin 230 includes outboard walls 232 and a ceiling 234. Windows 236 are formed within the outboard walls 232. A floor 238 supports rows of seats 240. As shown in FIG. 3, a row 242 may include three seats 240 on either side of an aisle 243. However, the row 242 may include more or less seats 240 than shown. Additionally, the internal cabin 230 may include more aisles than shown.

Figure 4:
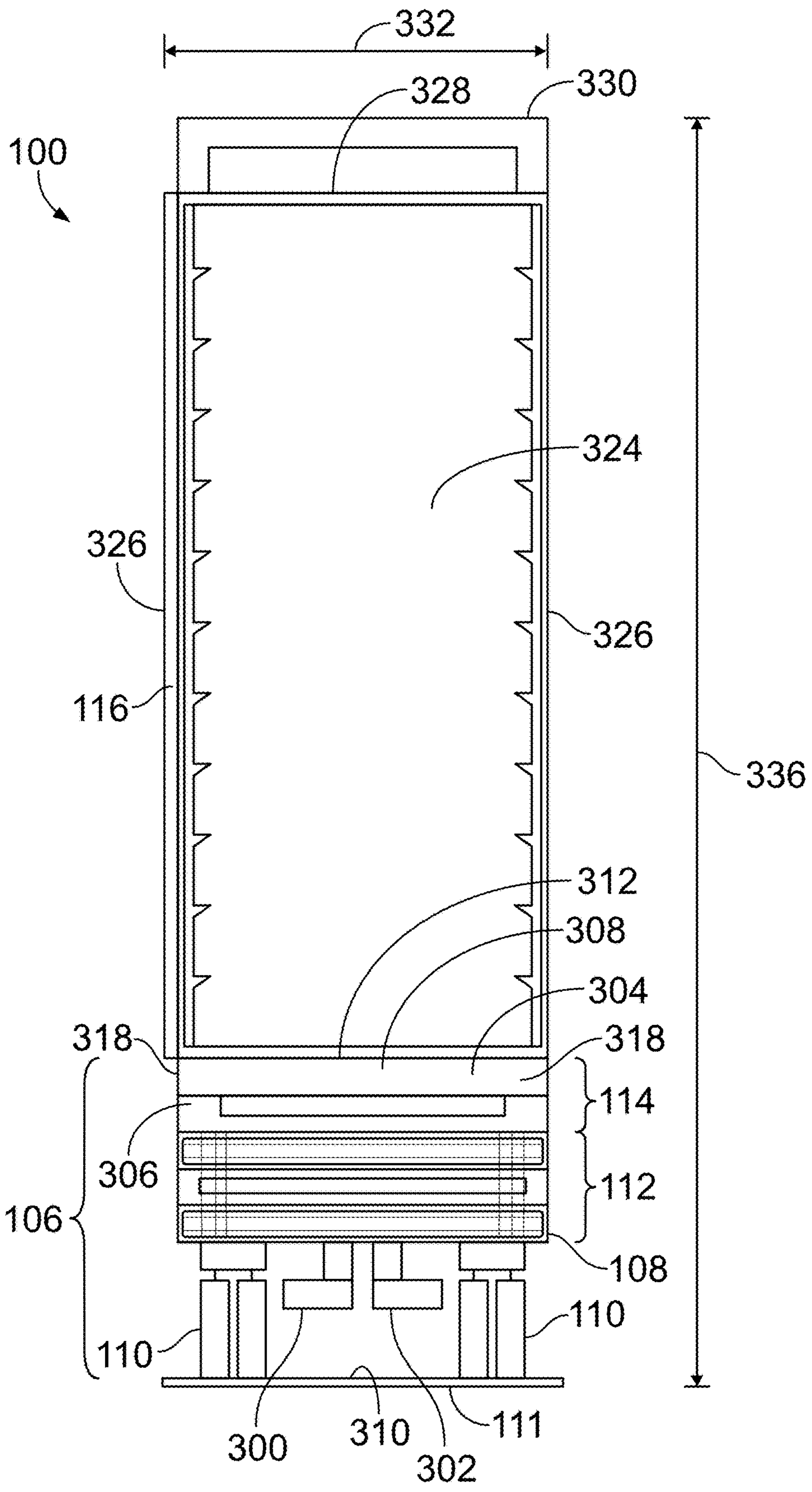
FIG. 4 illustrates a front view of the system having a cart housing secured to a wheelchair with a height adjuster in a collapsed position, according to an example of the present disclosure.
Figure 5:
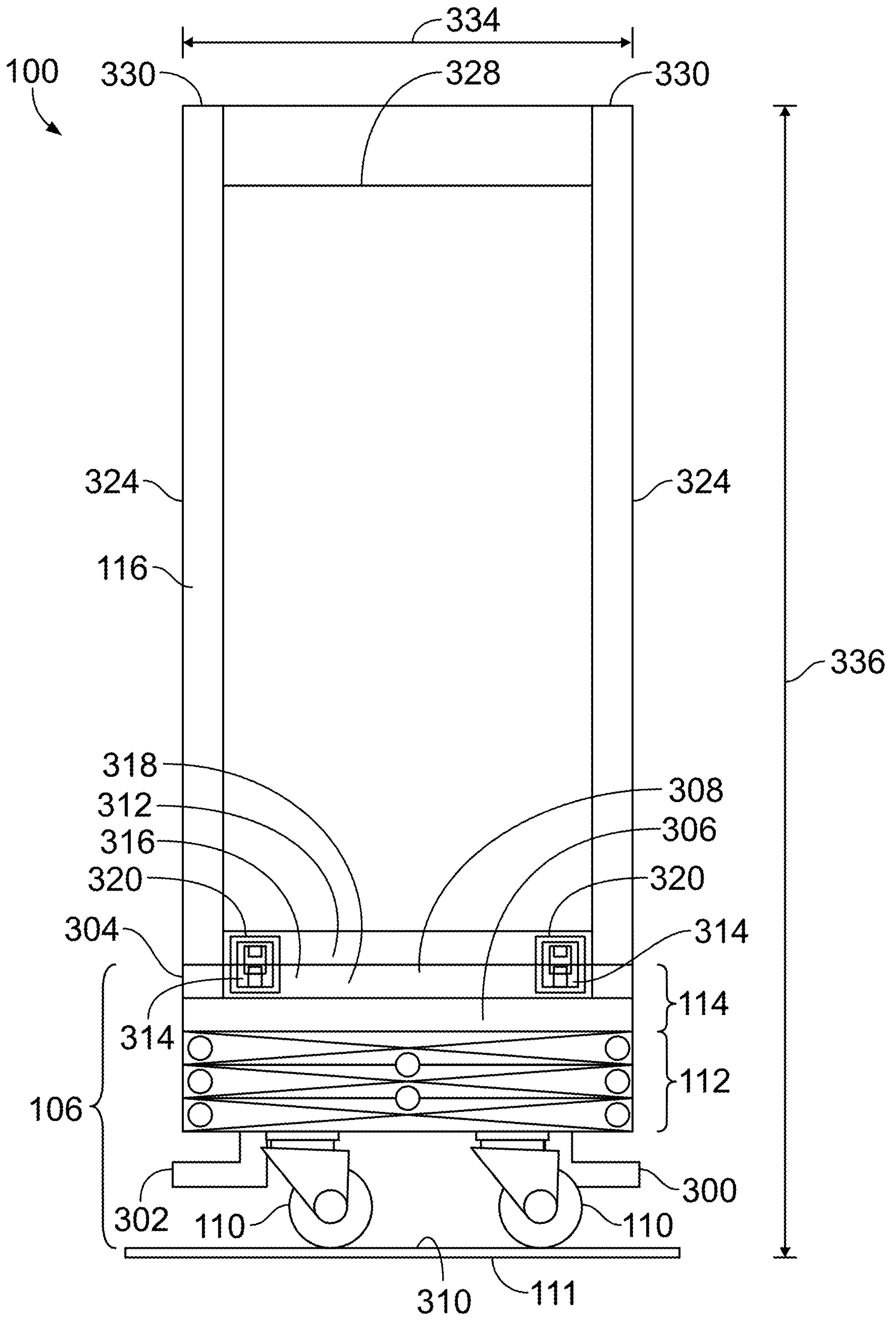
FIG. 5 illustrates a side view of the system having the cart housing secured to the wheelchair with the height adjuster in the collapsed position.

FIG. 4 illustrates a front view of the system 100 having the cart housing 116 secured to the wheelchair 106 with the height adjuster 112 in a collapsed position, according to an example of the present disclosure. FIG. 5 illustrates a side view of the system 100 having the cart housing 116 secured to the wheelchair 106 with the height adjuster 112 in the collapsed position. Referring to FIGS. 4 and 5, the height adjuster 112 includes a scissor jack. One or more wheels 110 extend downwardly from the platform 108 at each corner. The wheels 110 can be configured to swivel, or constrained from swiveling. For example, rear wheels 110 can be constrained from swiveling, while front wheels are configured to swivel. In at least one example, a brake pedal 300 is operatively coupled to one or more of the wheels 110, and a release pedal 302 is operatively coupled to one or more of the wheels 110 and/or the brake pedal 300. The brake pedal 300 is configured to be engaged, such as by a foot of an individual, to brake and stop one or more of the wheels 110 from rolling, while the release pedal 302 is configured to be engaged, such as by a foot of an individual, to release the brake pedal 300 from stopping rolling motion of the wheel(s) 110. Optionally, the system 100 may not include the brake pedal 300 and/or the release pedal 302.

As noted, the cart housing 116 is selectively secured to and removed from the wheelchair 106. In at least one example, the seat 114 includes the seatback 304, which is shown in the downward folded position, in which the seatback 304 is folded over the seat base 306. In the downward folded position, a rear surface 308 of the seatback 304 is substantially parallel (such as within +/−5 degrees) with an upper surface 310 of the floor 111. A lower surface 312 of the cart housing 116 is supported directly on the rear surface 308 of the seatback 304. One or more latches 314 are used to secure the cart housing 116 to the seatback 304. For example, two latches 314 are mounted on lateral surfaces 316 of each side 318 of the seatback 304. The latches 314 are configured to selectively engage with reciprocal latching members 320 of the cart housing 116.

The cart housing 116 includes end walls 324 connected to sidewalls 326, and countertop 328. An internal chamber is defined between the end walls 324, the sidewalls 326, and the countertop 328. The internal chamber includes one or more shelves, cabinets, and/or the like configured to retain various items, such as beverages, food items, trash, and the like. One or more handles 330 extend upwardly from the countertop 328, and are configured to be grasped by an individual, such as a flight attendant, to move the system 100 within an internal cabin.

In at least one example, the system 100 having the cart housing 116 secured to the wheelchair 106, as shown in FIGS. 4 and 5, is sized and shaped as a standard-sized galley cart, or a standard-sized half galley cart, thereby allowing the system 100 to be conveniently stored within a cart compartment 118 of a galley 120 (shown in FIG. 1). For example, the system 100 can have a width 332 of 12 inches or less (such as 11.84 inches), a length 334 of 16 inches or less (such as 15.95 inches), and a height 336 of 42 inches or less (such as 40.55 inches). Optionally, the system can have a width 332 of 12 inches or less (such as 11.84 inches), a length 334 of 32 inches or less (such as 31.89 inches), and a height 336 of 42 inches or less (such as 40.55 inches).

As described herein, the system 100 includes the wheelchair 106, and the cart housing 116, which is configured to be selectively secured to and removed from the wheelchair 106. The cart housing 116 secured to the wheelchair 106 is configured to be stored within the cart compartment 118 of the galley 120 within the internal cabin 102 of the vehicle 104.

Figure 6:
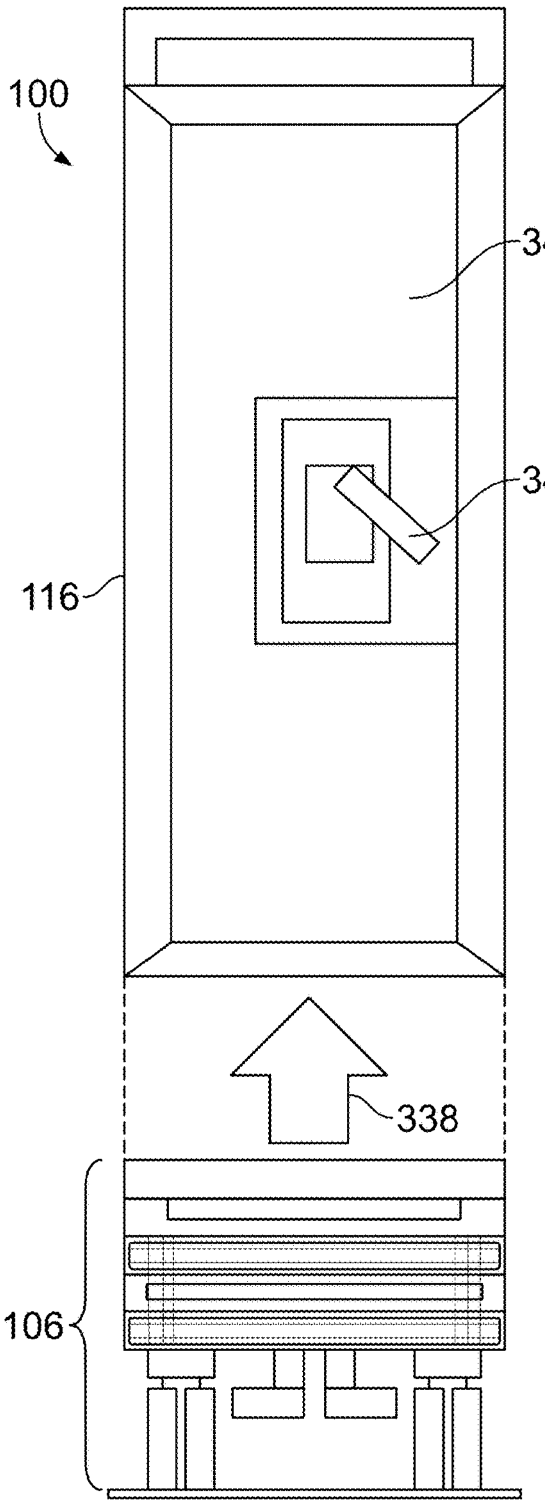
FIG. 6 illustrates a front view of the system having the cart housing being removed from the wheelchair, according to an example of the present disclosure.
Figure 7:
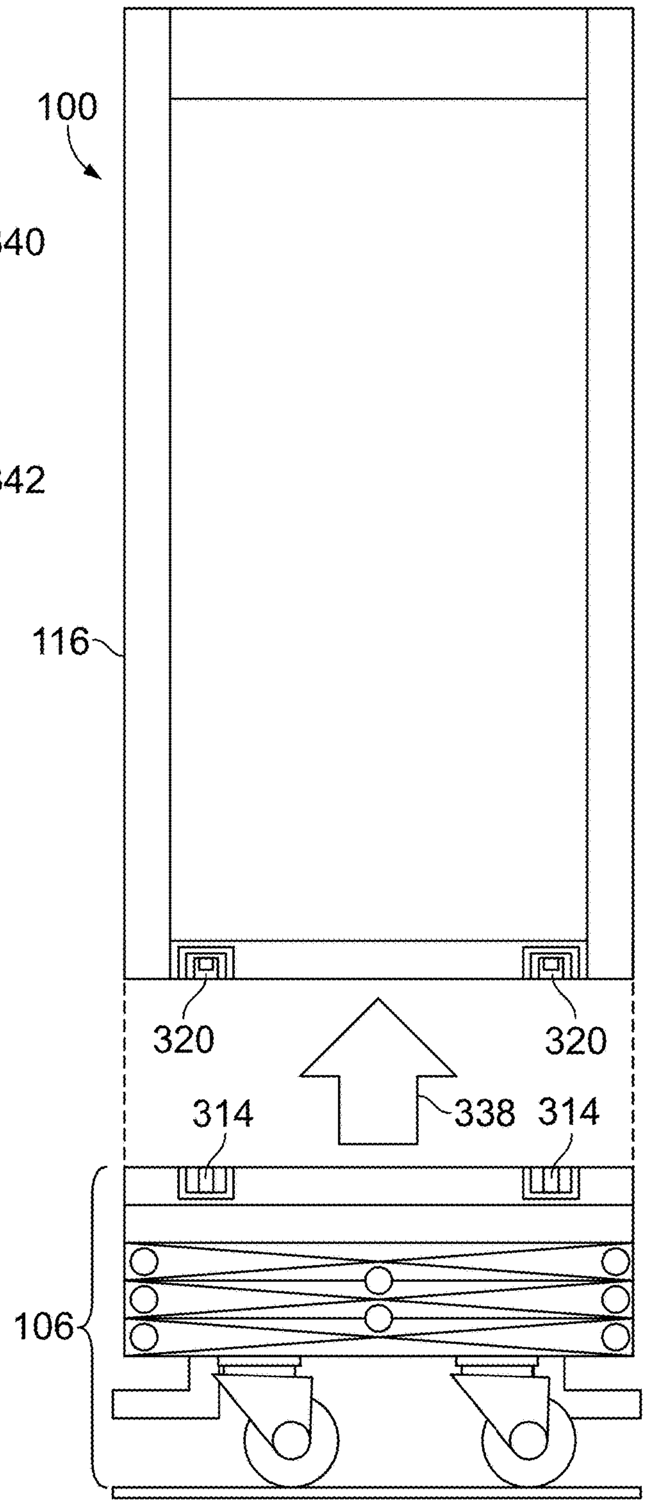
FIG. 7 illustrates a side view of the system having the cart housing being removed from the wheelchair.

FIG. 6 illustrates a front view of the system 100 having the cart housing 116 being removed from the wheelchair 106, according to an example of the present disclosure. FIG. 7 illustrates a side view of the system 100 having the cart housing 116 being removed from the wheelchair 106. Referring to FIGS. 4-7, in order to remove the cart housing 116, the latches 314 are operated to disengage from the reciprocal latching members 320. After the latches 314 are disengaged form the reciprocal latching members 320, the cart housing 116 is lifted upwardly off the wheelchair 106 in the direction of arrow 338. As such, the cart housing 116 is separated from the wheelchair 106.

As shown, the cart housing 116 includes a door 340 that is configured to be selectively opened and closed. A handle 342 is operatively coupled to the door 340 to allow the door 340 to be easily moved between an open position and a closed position. When the door 340 is opened, the internal chamber of the cart housing 116 is exposed. The door 340 and the handle 342 can be on one end of the cart housing 116, or each end can include a door 340 and a handle 342.

Figure 8:
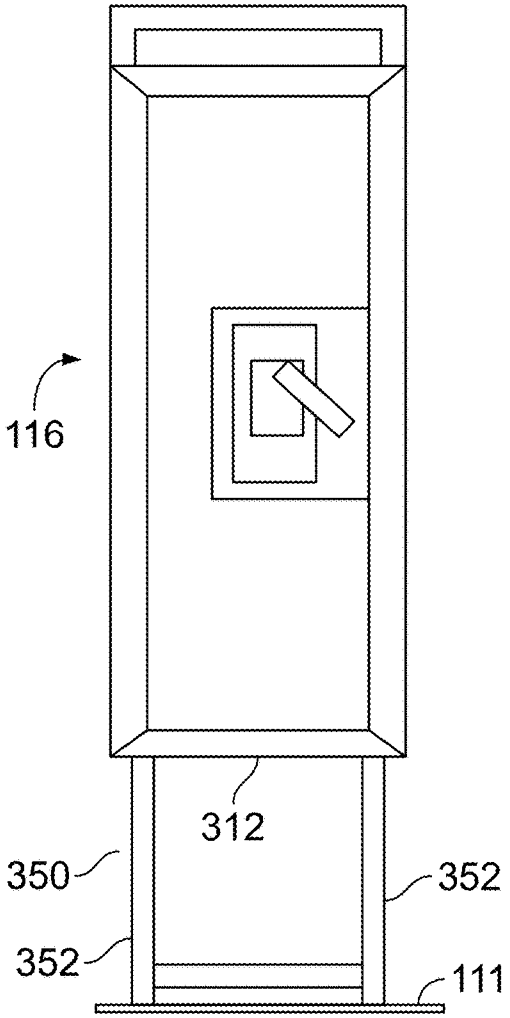
FIG. 8 illustrates a front view of the cart housing having lower support stands in a deployed position, according to an example of the present disclosure.
Figure 9:
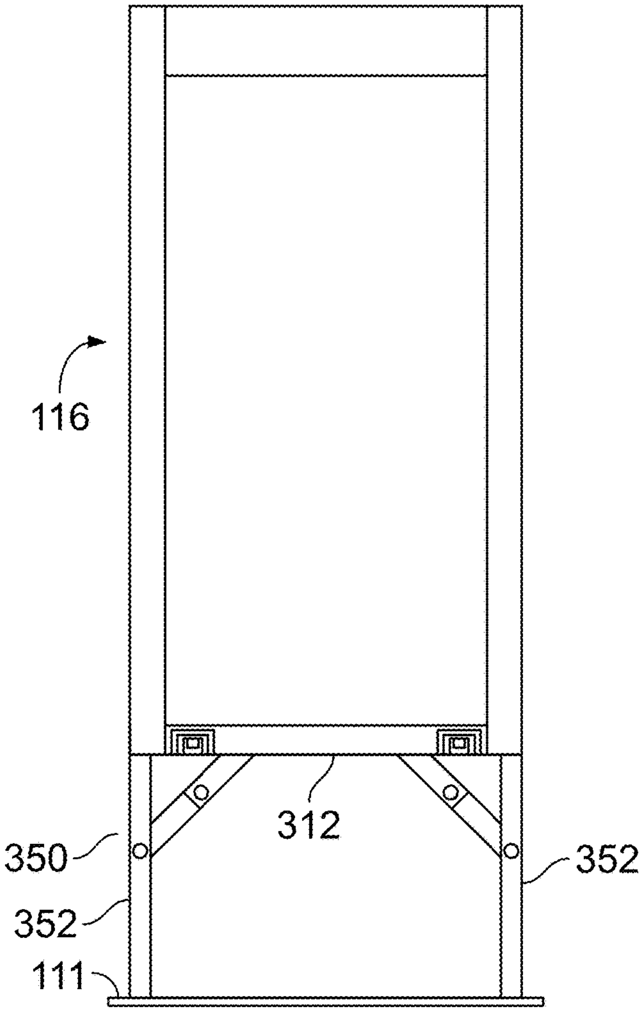
FIG. 9 illustrates a side view of the cart housing having the lower support stands in the deployed position.

FIG. 8 illustrates a front view of the cart housing 116, according to an example of the present disclosure. FIG. 9 illustrates a side view of the cart housing 116. After the cart housing 116 is removed from the wheelchair 106 (shown in FIGS. 4-7), the cart housing 116 can be disposed within an internal cabin, such as within a cart compartment. A moveable stand 350 is secured to the lower surface 312 of the cart housing 116. The stand 350 can include foldable legs 352, such as kickstands, which can be pivoted between deployed positions, as shown in FIGS. 8 and 9, and retracted positions, in which the legs 352 are folded against and underneath the lower surface 312. Optionally, the cart housing 116 may not include the stand 350. Instead, the lower surface 312 of the cart housing 116 may be configured to rest directly on the floor 111.

Figure 11:
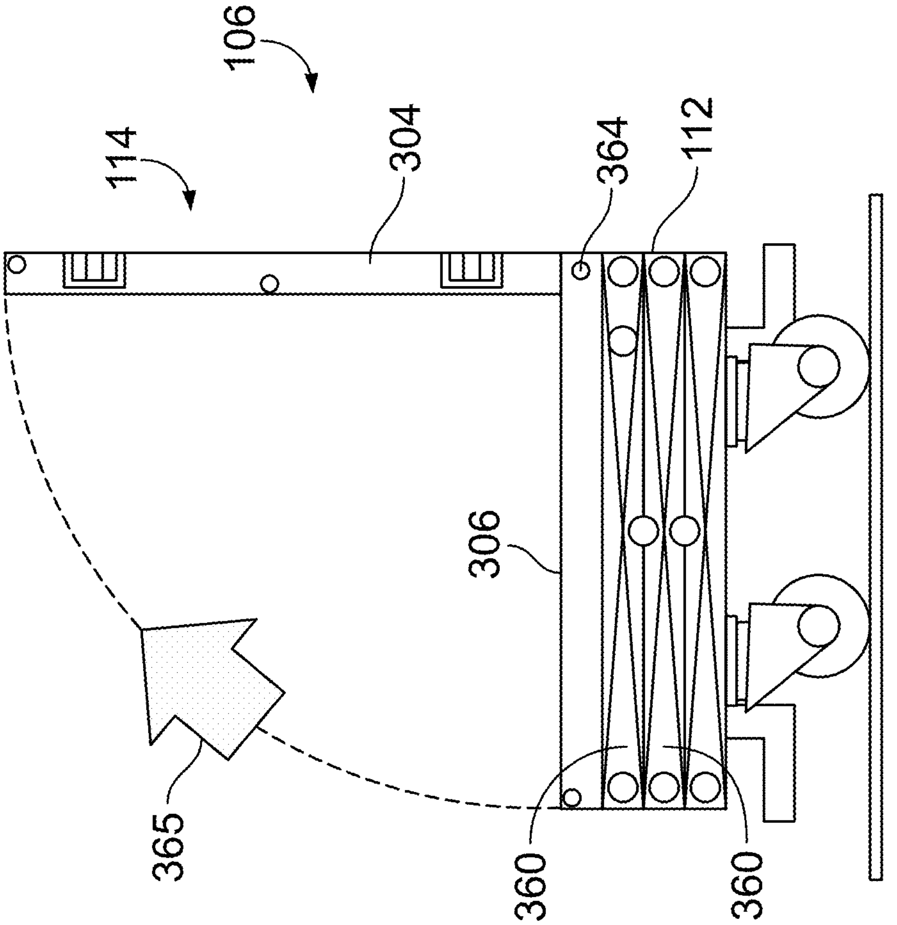
FIG. 11 illustrates a side view of the wheelchair having the height adjuster in the collapsed position.
Figure 10:
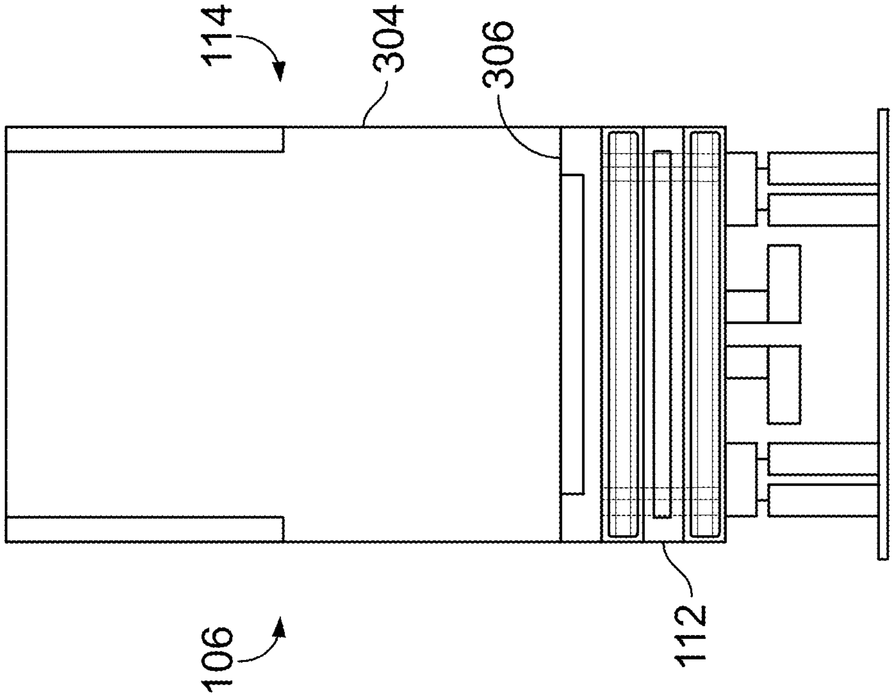
FIG. 10 illustrates a front view of the wheelchair having the height adjuster in the collapsed position, according to an example of the present disclosure.

FIG. 10 illustrates a front view of the wheelchair 106 having the height adjuster 112 in the collapsed position, according to an example of the present disclosure. FIG. 11 illustrates a side view of the wheelchair 106 having the height adjuster 112 in the collapsed position. Referring to FIGS. 10 and 11, in at least one example, the height adjuster 112 is a scissor jack having a plurality of arms 360 pivotally coupled together.

After the cart housing 116 (shown in FIGS. 6-9) has been removed from the wheelchair 106, an individual can be seated on the wheelchair 106. As such, the seatback 304 is upwardly pivoted in the direction of arc 365 from the downward folded position about a pivotal connection 364 with the seat base 306. In this manner, the seat base 306 is exposed, and an individual may sit thereon. The height adjuster 112 can be operated, such as via a hand crank, foot pedal, motor, and/or the like, to move the seat 114 to a particular height desired by an individual.

Figure 13:
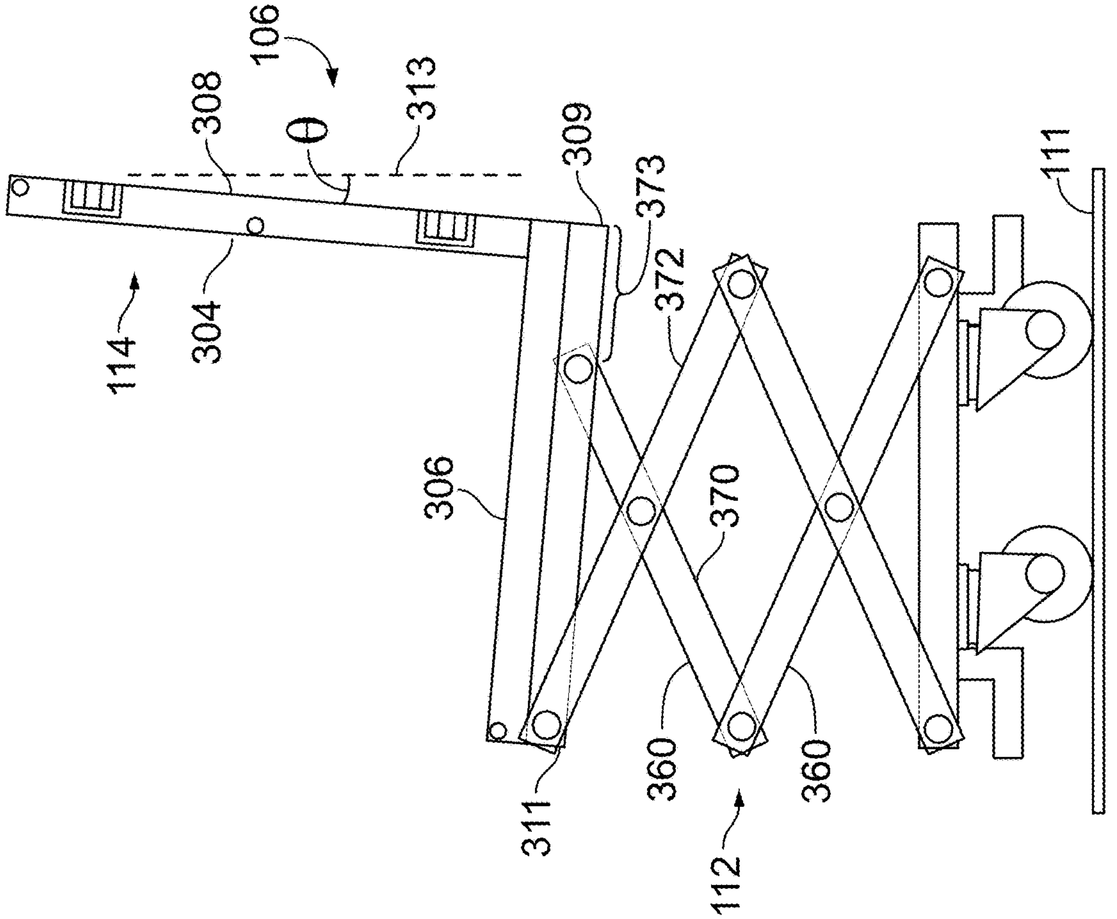
FIG. 13 illustrates a side view of the wheelchair having the height adjuster in the extended position.
Figure 12:
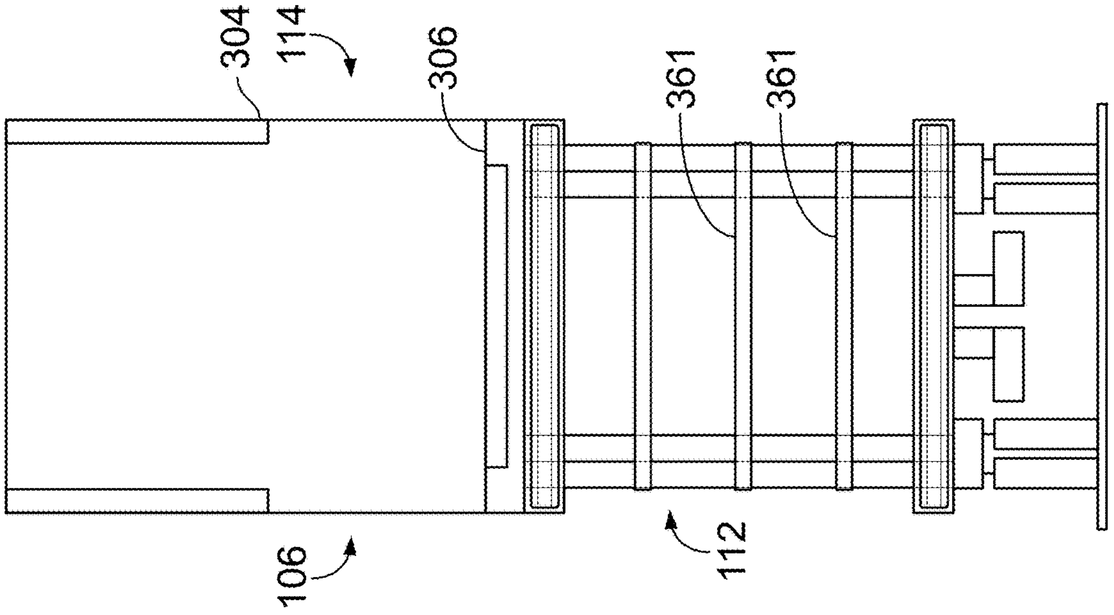
FIG. 12 illustrates a front view of the wheelchair having the height adjuster in an extended position, according to an example of the present disclosure.

FIG. 12 illustrates a front view of the wheelchair 106 having the height adjuster 112 in an extended position, according to an example of the present disclosure. FIG. 13 illustrates a side view of the wheelchair 106 having the height adjuster 112 in the extended position. Referring to FIGS. 12 and 13, the height adjuster 112 can be operated to extend the seat 114 to a desired height. For example, the height adjuster 112 can be a scissor jack having arms 360 pivotally coupled to bracing supports 361. As shown, a first upper arm 370 pivotally couples to a rear section of the seat base 306, while a second upper arm 372 pivotally couples to a front section of the seat base 306. The first upper arm 370 is shorter than the second upper arm 372. As such, the first upper arm 370 pivotally couples to the rear section of the seat base 306 a distance 373 from a rear end 309 of the seat base 306, while the second upper arm 372 pivotally couples to a front end 311 of the seat base 306. As such, when the seat 114 is moved upwardly by the height adjuster 112, the seat 114 tilts back, thereby ensuring an individual seated on the seat base is not susceptible to sliding forward on the seat base 306. As shown, when the seat 114 is moved upwardly by the height adjuster 112, an angle θ is defined between the rear surface 308 of the seatback 304, and a vertical plane 313 that is perpendicular to a plane of a top surface of the floor 111. The arms 370 and 372 can be sized to provide the angle θ, such as between 5-15 degrees. Optionally, the lengths of the arms 370 can be the same, such that the seat base 306 is not configured to tilt back when the height adjuster 112 upwardly moves the seat 114.

The height adjuster 112 is configured to be operated to move between the collapsed position (as shown in FIGS. 6 and 7, for example), and a fully extended position (and all positions therebetween). In this manner, the height adjuster 112 can be operated to adjust a height of the seat 114 to a desired level.

Figure 14:
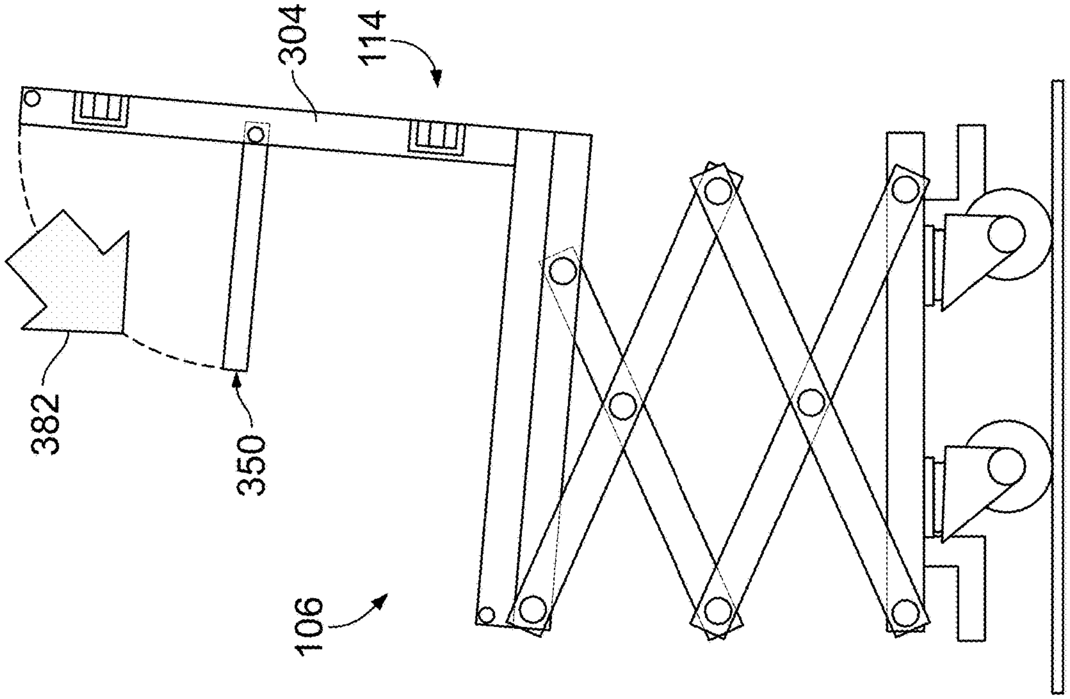
FIG. 14 illustrates a side view of the wheelchair having an armrest in a deployed position, according to an example of the present disclosure.

FIG. 14 illustrates a side view of the wheelchair 106 having an armrest 380 in a deployed position, according to an example of the present disclosure. Armrests 380 are pivotally coupled to sides of the seatback 304. The armrests 380 are configured to be pivoted in the direction of arrow 382 into the deployed positions (as shown in FIG. 14), and back to stowed positions, in which the armrests 380 are generally parallel and against the sides of the seatback 304. Alternatively, the wheelchair 106 may not include the armrests.

Figure 15:
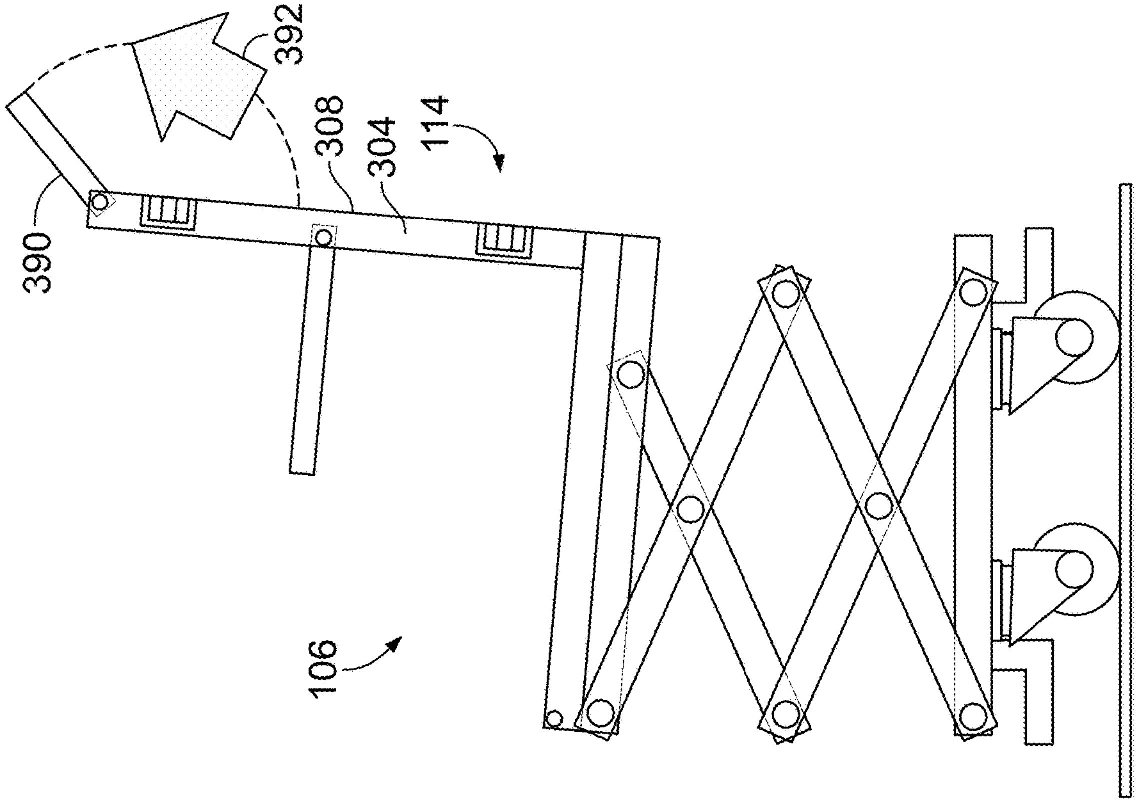
FIG. 15 illustrates a side view of the wheelchair having a handle in a deployed position, according to an example of the present disclosure.

FIG. 15 illustrates a side view of the wheelchair 106 having a handle 390 in a deployed position, according to an example of the present disclosure. The handle 390 is pivotally coupled to a top of the seatback 304. The handle 390 is configured to be pivoted in the direction of arc 392 into the deployed position (as shown in FIG. 15), and back to a stowed position, in which the handle 390 is folded into or otherwise against the rear surface 308 of the seatback 304. The handle 390 in the deployed position allows an individual to easily grasp the handle 390 and control movement of the wheelchair 106. Alternatively, the wheelchair 106 may not include the handle.

Figure 16:
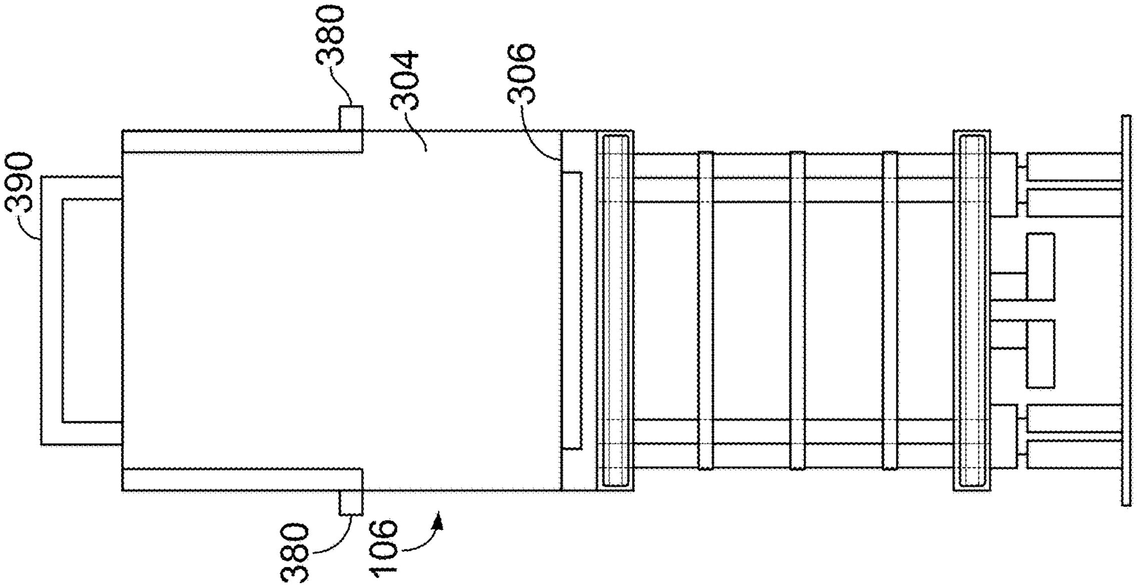
FIG. 16 illustrates a front view of the wheelchair having a footrest in a deployed position, according to an example of the present disclosure.

FIG. 16 illustrates a front view of the wheelchair having the armrests 380 in deployed positions, and the handle 390 in a deployed position, according to an example of the present disclosure. An individual can sit on the seat base 306 and be moved by another individual holding the handle 390 (or other portions of the wheelchair 106).

Figure 17:
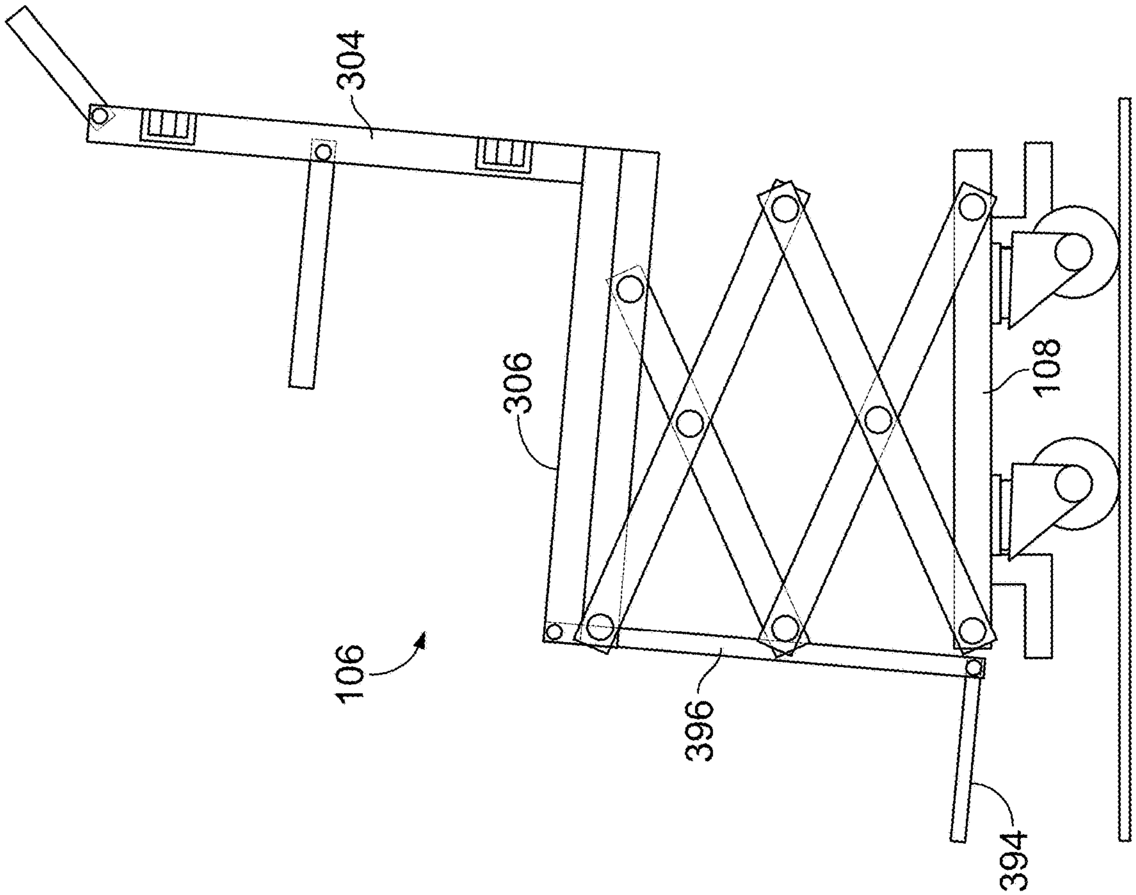
FIG. 17 illustrates a side view of the wheelchair having a footrest in a deployed position, according to an example of the present disclosure.

FIG. 17 illustrates a side view of the wheelchair 106 having a footrest 394 in a deployed position, according to an example of the present disclosure. The footrest 394 can be a foldable panel pivotally coupled to an extension arm 396 that pivotally couples to a side of the seat base 306. The extension arm 396 and the footrest 394 are configured to be pivoted between stowed positions against the seat base 306, and deployed positions downwardly away from the seat base 306 as shown in FIG. 17. Optionally, the footrest 394 can be moveably coupled to the platform 108 instead of the seat base 306. Alternatively, the wheelchair 106 may not include a footrest.

Figure 18:
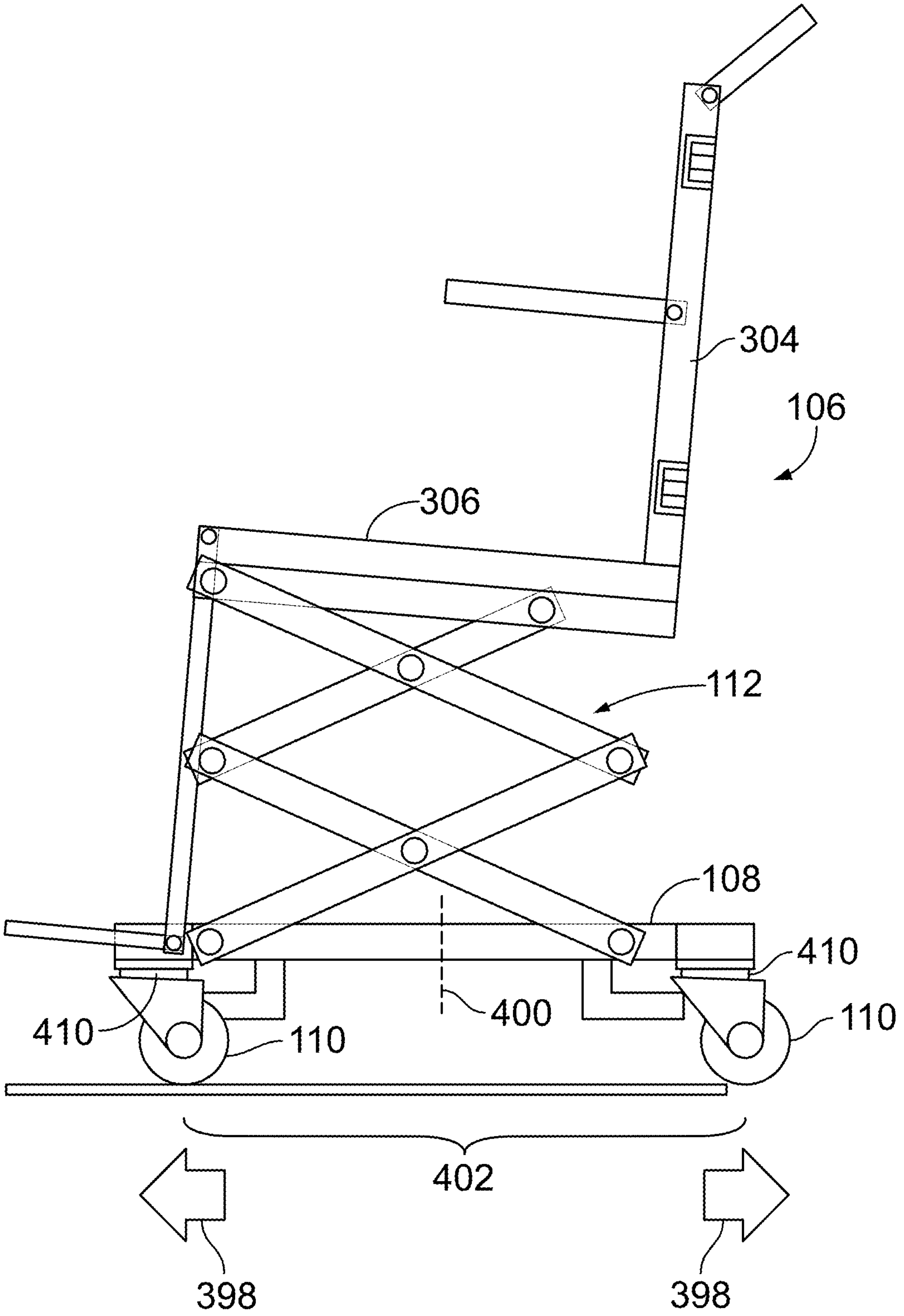
FIG. 18 illustrates a side view of the wheelchair, according to an example of the present disclosure.

FIG. 18 illustrates a side view of the wheelchair 106, according to an example of the present disclosure. In at least one example, the wheels 110 are configured to linearly shift outwardly toward ends of the platform 108. For example, the wheels 110 can connect to the platform 108 through bearings 410 that are configured to slide or other move, tracks, springs, and/or the like. Thus, the wheels 110 can be linearly adjusted outwardly away in the directions of arrows 398 from a central plane 400 to expand a wheelbase 402 of the wheelchair 106. The expanded wheelbase 402 increases stability of the wheelchair 106.

In at least one example, the wheels 110 can be manually adjusted to the expanded wheelbase 402. As another example, the wheels 110 can coupled to the platform 108 through springs, which extend in response to weight on the seat base 306. As another example, the bearings 410 of the wheels 110 that moveably couple to the platform 108 can be coupled to the height adjuster 112 (such as a scissor jack) and move in response to operation of the height adjuster 112. Alternatively, the wheelbase 402 of the wheelchair 106 is not configured to change.

Figure 19:
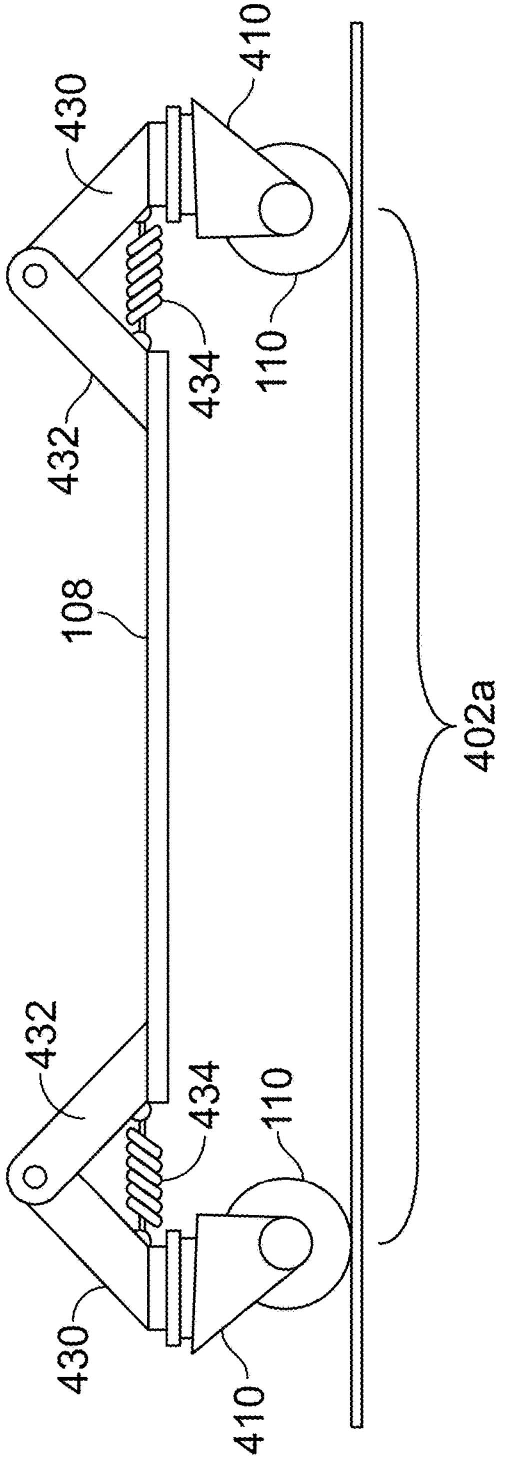
FIG. 19 illustrates a side view of a wheelbase in an at-rest position, according to an example of the present disclosure.
Figure 20:
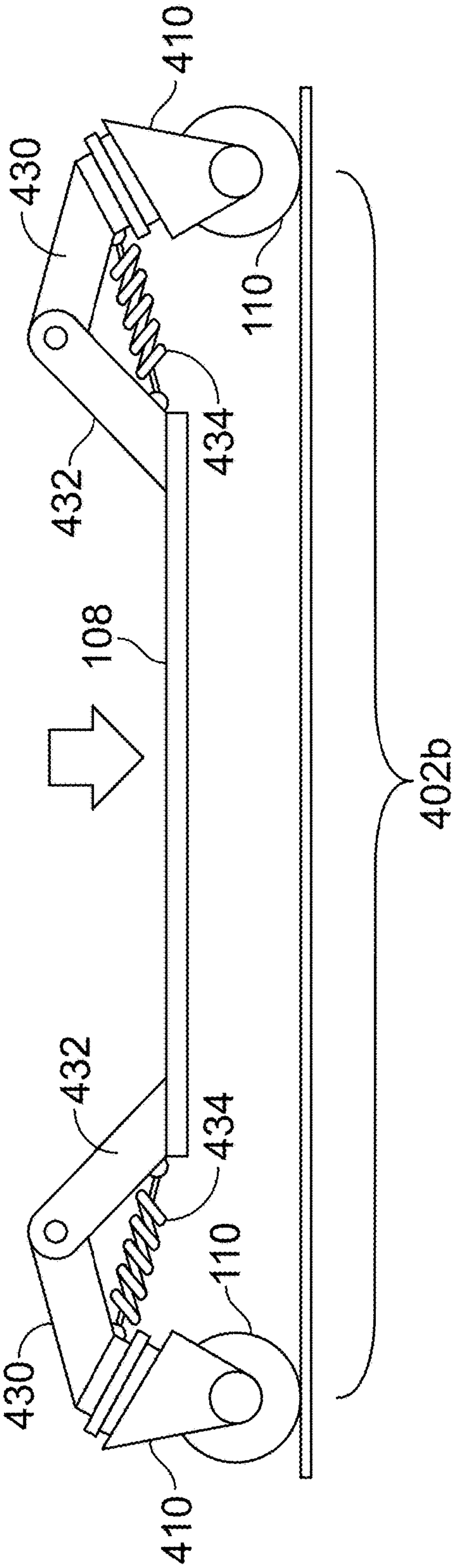
FIG. 20 illustrates a side view of a wheelbase in an expanded position, according to an example of the present disclosure.

FIG. 19 illustrates a side view of a wheelbase **402*a* in an at-rest position, according to an example of the present disclosure. FIG. 20 illustrates a side view of a wheelbase 402*b* in an expanded position, according to an example of the present disclosure. Referring to FIGS. 19 and 20, the bearings 410 are coupled to the platform 108 through a first arm 430 pivotally coupled to a second arm 432, and a spring 434 connecting the first arm 430 and the second arm 432. As shown in FIG. 19, when no weight is exerted downwardly into the platform, the springs 434 are in at-rest positions, thereby retaining the wheelbase 402*a* at the at-rest position. When an individual sits on the seat 114 of the wheelchair 106 (shown in FIG. 18, for example), the weight of the individual is transferred into the platform 108, which causes the first arms 430 and the second arms 432 to outwardly spread as shown in FIG. 20, while the springs 434 exert a resistive force therebetween, but extend to provide the expanded wheelbase 402*b*. When the individual unseats from the wheelchair 106, the springs 434 pull and retract the first arms 430 and the second arms 432 to return the wheels 110 to the wheelbase 402*a***.

Figure 21:
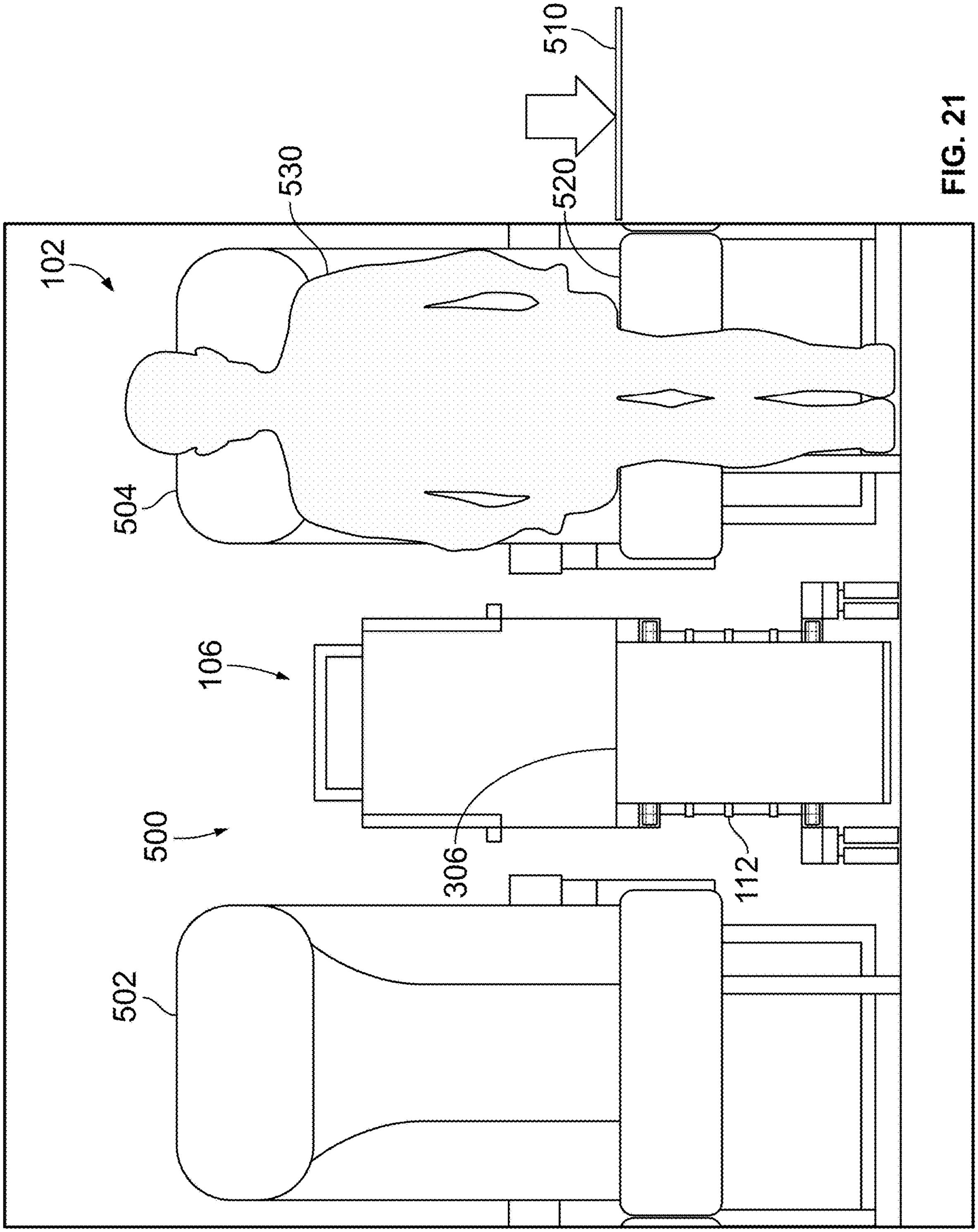
FIG. 21 illustrates front view of a wheelchair within an aisle of an internal cabin, and elevated to the same height as an adjacent passenger seat, according to an example of the present disclosure.

FIG. 21 illustrates front view of the wheelchair 106 within an aisle 500 of an internal cabin 102, according to an example of the present disclosure. The aisle 500 extends between passengers seats 502 and 504. The height adjuster 112 is operated so that the seat base 306 can be at a level 510 of a seat base 520 of the passenger seats 502 and 504, thereby allowing for easy transfer of an individual 530 between a passenger seat 502 or 504 and the seat base 306 of the wheelchair 106.

Figure 22:
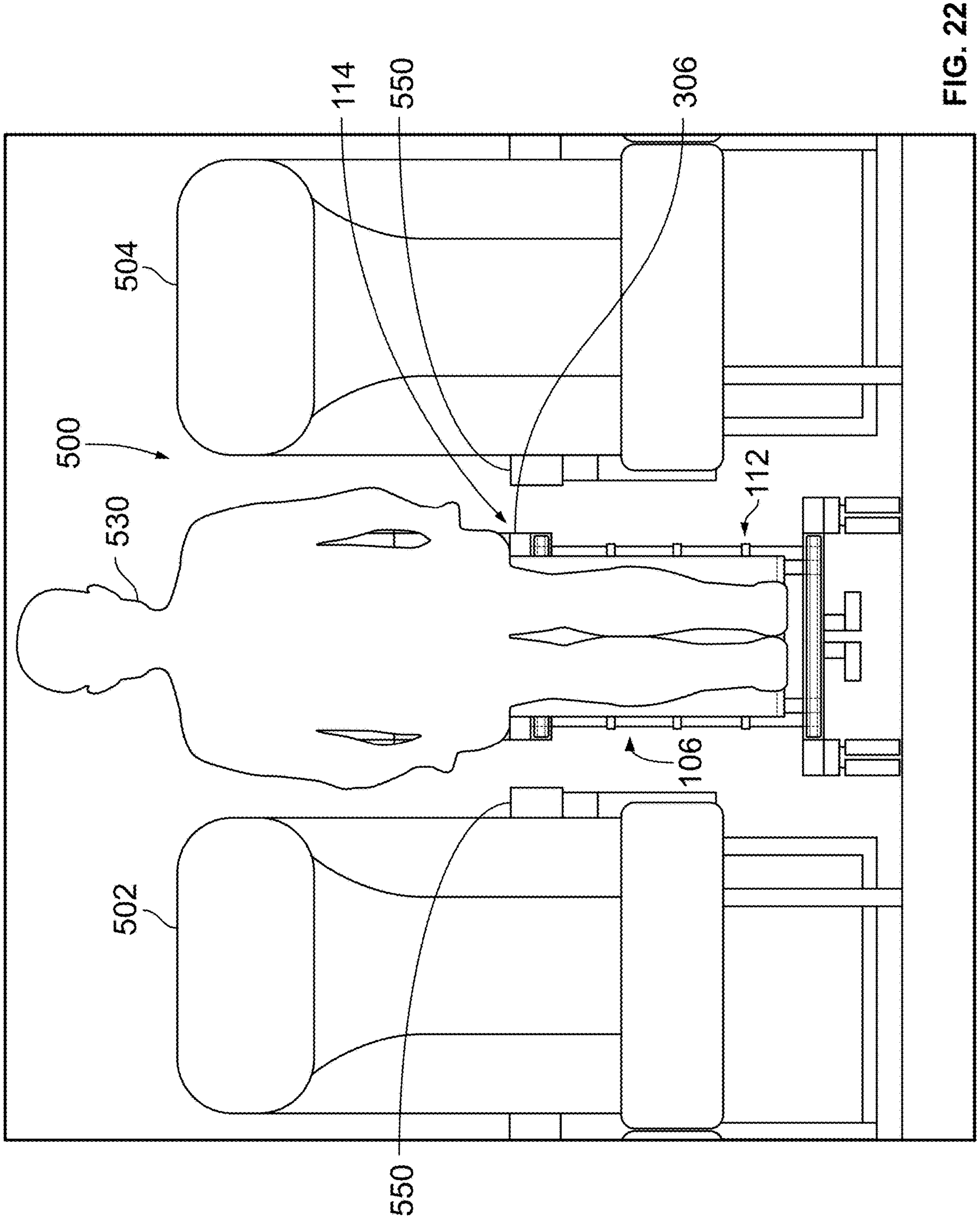
FIG. 22 illustrates a front view of an individual seated on the wheelchair within the aisle, and elevated above armrests of passenger seats, according to an example of the present disclosure.

FIG. 22 illustrates a front view of the individual 530 seated on the wheelchair 106 within the aisle 500, according to an example of the present disclosure. When the individual 530 is on the wheelchair 106, the height adjuster 112 can be operated to move to a fully extended position, such that the seat base 306 is above a level of armrests 550 of the seats 502 and 504, thereby ensuring that the individual 530 does not contact the armrests 550 when being moved within the aisle 500. In this manner, the wheelchair 106 can be operated to reduce potential injuries to the individual 530. Alternatively, the fully extended position may not dispose the seat base 306 above the armrests 550.

Referring to FIGS. 1-22, examples of the present disclosure provide a height adjustable transfer wheelchair which is useable and storable within an internal cabin of a vehicle. In at least one example, the system 100 having the cart housing 116 secured to the wheelchair 106 (in a collapsed position) is configured to be stored in the cart compartment 118 of the galley 120. For example, in such state, the system 100 can have a width of 11.84 inches, a height of 40.55 inches, and a length of 15.95 inches, which is generally the size of a standard half-size galley cart. Optionally, the system 100 can have a width of 11.84 inches, a height of 40.55 inches, a length of 31.89 inches, which is generally the size of a standard full-size galley cart (but can have a longer length, for example). The cart housing 116 is configured to be removed from the wheelchair 106, which can be then moved and adjusted to provide a safe, comfortable transfer seat for an individual. By coupling the wheelchair 106 to the cart housing 116, the system 100 can be stored in the cart compartment without the loss of an entire space for a galley cart (as the system 100 can be used as a galley cart when then cart housing 116 is coupled to the wheelchair 106). Both the cart housing 116 and the wheelchair 106 roll on the floor 111 via the same wheels 110. Further, both the cart housing 116 and the wheelchair 106 can use the same brake pedal 300 and release pedal 302. The wheelbase 402 can be extended when an individual is seated on the wheelchair 106, thereby increasing stability, particularly when the height adjuster 112 extends to a fully extended position.

In at least one example, the height adjuster 112 includes one or more of a scissor jack, a hydraulic bottle jack, and/or a motor, each of which can be used independently of one another, or in combination. For example, the hydraulic bottle jack can be operated to provide large incremental height adjustment (for example, inch-by-inch lift), and the scissor jack can be operated to provide fine-tuned height adjustment.

In at least one example, the wheelchair 106 can also include restraints, such as leg or angle straps, waist straps, chest straps, and/or the like. Optionally, the wheelchair 106 may not include restraints.

Figure 23:
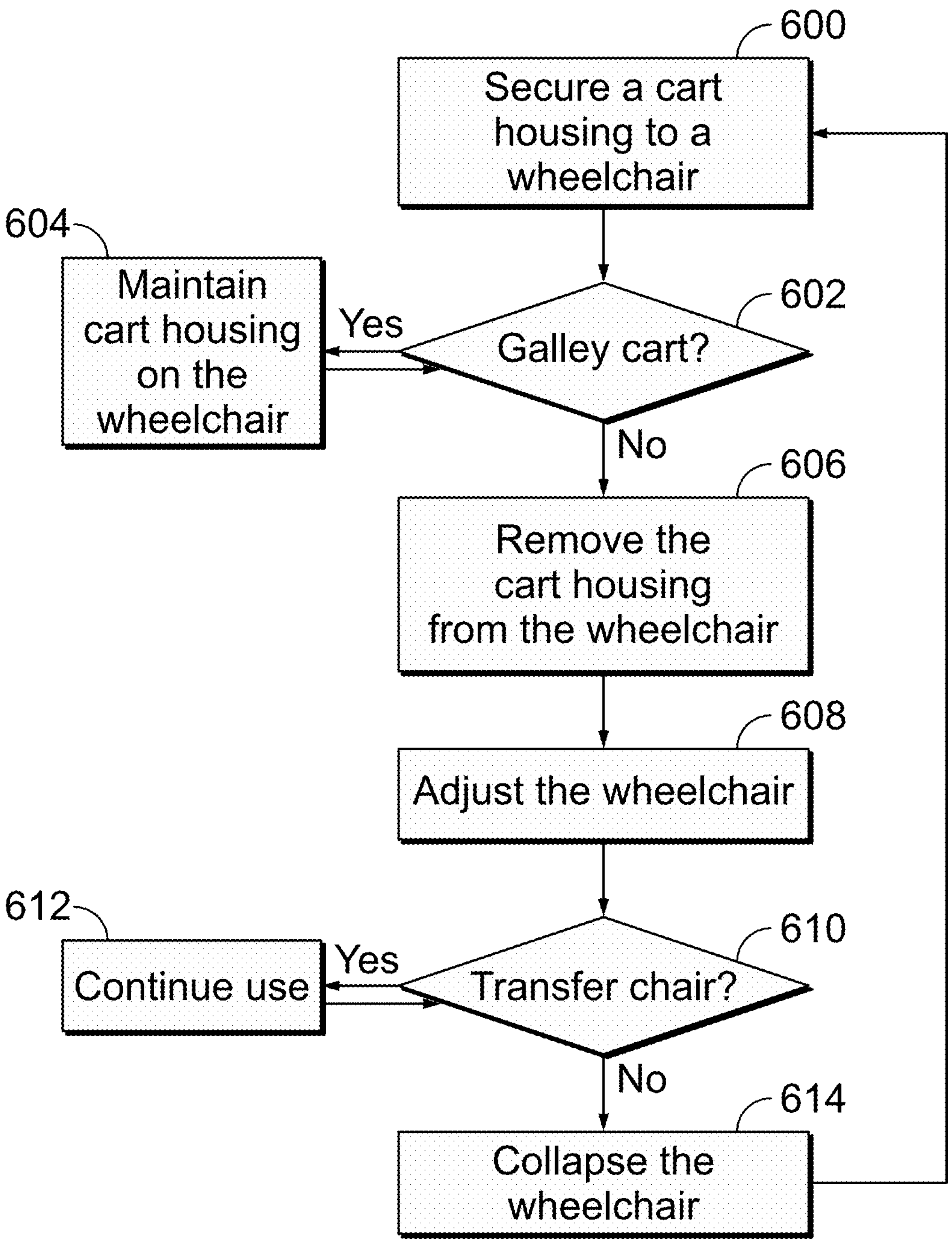
FIG. 23 illustrates a flow chart of a method, according to an example of the present disclosure.

FIG. 23 illustrates a flow chart of a method, according to an example of the present disclosure. Referring to FIGS. 1 and 23, at 600, the cart housing 116 is secured to the wheelchair 106. At 602, it is determined if the system 100 is to be used as a galley cart. If so, the method proceeds to 604, at which the cart housing 116 is maintained in a secured position on the wheelchair 106. The method then returns to 602.

If, at 602, the system 100 is not to be used as a galley cart, the method proceeds to 606, at which the cart housing 116 is removed from the wheelchair 106. At 608, the wheelchair 106 is then adjusted, such as via the height adjuster 112, arm rests, footrests, handles, and/or the like, as desired.

At 610, it is determined if the system 100 is still to be used as a transfer chair (that is, a wheelchair). If so, the method proceeds to 612, at which the system 100 continues to be used as a transfer chair, and the method returns to 610. If, at 610, the system 100 is no longer to be used as a wheelchair, the method proceeds to 614, at which the wheelchair 106 is collapsed (such as via the height adjuster, seatback 304 being pivoted back to a folded position, and the like), and the method returns to 600, at which the cart housing 116 is secured to the wheelchair 106.

Further, the disclosure includes examples according to the following clauses:

Clause 1. A system comprising:

a wheelchair; and a cart housing removably coupled to the wheelchair, wherein the cart housing is configured to be selectively secured to and removed from the wheelchair, wherein the system is operable as a galley cart when the cart housing is secured to the wheelchair, and wherein the system is operable as transfer chair when the cart housing is removed from the wheelchair.

Clause 2. The system of Clause 1, wherein the cart housing secured to the wheelchair is configured to be stored within a cart compartment of a galley within an internal cabin of a vehicle.

Clause 3. The system of Clauses 1 or 2, wherein the wheelchair comprises:

a platform;

wheels downwardly extending from the platform;

a height adjuster supported on the platform opposite from the wheels; and a seat secured to the height adjuster.

Clause 4. The system of Clause 3, wherein the height adjuster comprises one or more of a scissor jack, a hydraulic bottle jack, or a motor.

Clause 5. The system of Clauses 3 or 4, wherein the height adjuster is configured to be moved between a collapsed position, in which the seat is at a lowest level, and a fully extended position, in which the seat is at a highest level.

Clause 6. The system of Clause 5, wherein the seat tilts back when the height adjuster moves from the collapsed position toward and into the fully extended position.

Clause 7. The system of any of Clauses 3-6, wherein wheelchair further comprises:

a brake pedal operatively coupled to one or more of the wheels; and a release pedal operatively coupled to the brake pedal or the one or more of the wheels.

Clause 8. The system of any of Clauses 3-7, wherein the wheels are moveable between different wheelbases.

Clause 9. The system of Clause 8, wherein the wheels are coupled to the platform by one or both of one or more springs or one or more energy storage devices (such as gas struts).

Clause 10. The system of any of Clauses 3-9, wherein the height adjuster is operable to move the seat above a level of armrests of passenger seats within an internal cabin of a vehicle.

Clause 11. The system of any of Clauses 1-10, wherein the cart housing is configured to retain one or more of beverages, food items, or trash.

Clause 12. The system of any of Clauses 1-11, wherein the wheelchair comprises a seatback pivotally coupled to a seat base, wherein the seatback is moveable between an upright position, and a downward folded position, wherein the seatback is folded over the seat base in the downward folded position, and wherein the cart housing is configured to be secured to a rear surface of the seatback in the downward folded position.

Clause 13. The system of Clause 12, further comprising one or more armrests moveably coupled to the seatback.

Clause 14. The system of Clauses 12 or 13, further comprising one or more handles moveably coupled to the seatback.

Clause 15. The system of any of Clauses 12-14, further comprising one or more footrests.

Clause 16. The system of Clause 15, wherein the one or more footrests are moveably coupled to the seat base.

Clause 17. The system of any of Clauses 1-16, further comprising one or more latches configured to removably secure the cart housing to the wheelchair.

Clause 18. The system of any of Clauses 1-17, wherein the cart housing secured to the wheelchair is sized and shaped as a half size or a full size galley cart.

Clause 19. The system of any of Clauses 1-18, wherein the cart housing comprises a moveable stand secured to a lower surface.

Clause 20. A method for a system comprising:

a wheelchair; and a cart housing configured to be selectively secured to and removed from the wheelchair, the method comprising:

removably coupling the cart housing to the wheelchair;

operating the system as a galley cart when the cart housing is secured to the wheelchair; and operating the system as a transfer chair when the cart housing is removed from the wheelchair.

Clause 21. A vehicle comprising:

an internal cabin including a galley, wherein a cart compartment is within the galley; and a system comprising:

a wheelchair; and a cart housing removably coupled to the wheelchair, wherein the cart housing is configured to be selectively secured to and removed from the wheelchair, wherein the system is operable as a galley cart when the cart housing is secured to the wheelchair, and wherein the system is operable as transfer chair when the cart housing is removed from the wheelchair, and wherein system having the cart housing secured to the wheelchair is stored within the cart compartment of the galley.

As described herein, examples of the present disclosure provide systems and methods that increase useable space within an internal cabin of a vehicle. Further, examples of the present disclosure provide a system and a method for disposing a wheelchair within an internal cabin, while also reducing space occupied by the wheelchair within the internal cabin.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S. C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a wheelchair; and a cart housing removably coupled to the wheelchair, wherein the cart housing is configured to be selectively secured to and removed from the wheelchair, wherein the system is operable as a galley cart when the cart housing is secured to the wheelchair, and wherein the system is operable as a transfer chair when the cart housing is removed from the wheelchair.

2. The system of claim 1, wherein the cart housing secured to the wheelchair is configured to be stored within a cart compartment of a galley within an internal cabin of a vehicle.

3. The system of claim 1, wherein the wheelchair comprises:

a platform;

wheels downwardly extending from the platform;

a height adjuster supported on the platform opposite from the wheels; and a seat secured to the height adjuster.

4. The system of claim 3, wherein the height adjuster comprises one or more of a scissor jack, a hydraulic bottle jack, or a motor.

5. The system of claim 3, wherein the height adjuster is configured to be moved between a collapsed position, in which the seat is at a lowest level, and a fully extended position, in which the seat is at a highest level.

6. The system of claim 5, wherein the seat tilts back when the height adjuster moves from the collapsed position toward and into the fully extended position.

7. The system of claim 3, wherein the wheelchair further comprises:

a brake pedal operatively coupled to one or more of the wheels; and a release pedal operatively coupled to the brake pedal or the one or more of the wheels.

8. The system of claim 3, wherein the wheels are moveable between different wheelbases.

9. The system of claim 8, wherein the wheels are coupled to the platform by one or both of one or more springs or one or more energy storage devices.

10. The system of claim 3, wherein the height adjuster is operable to move the seat above a level of armrests of passenger seats within an internal cabin of a vehicle.

11. The system of claim 1, wherein the cart housing is configured to retain one or more of beverages, food items, or trash.

12. The system of claim 1, wherein the wheelchair comprises a seatback pivotally coupled to a seat base, wherein the seatback is moveable between an upright position, and a downward folded position, wherein the seatback is folded over the seat base in the downward folded position, and wherein the cart housing is configured to be secured to a rear surface of the seatback in the downward folded position.

13. The system of claim 12, further comprising one or more armrests moveably coupled to the seatback.

14. The system of claim 12, further comprising one or more handles moveably coupled to the seatback.

15. The system of claim 12, further comprising one or more footrests.

16. The system of claim 15, wherein the one or more footrests are moveably coupled to the seat base.

17. The system of claim 1, further comprising one or more latches configured to removably secure the cart housing to the wheelchair.

18. The system of claim 1, wherein the cart housing secured to the wheelchair is sized and shaped as a half size or full size galley cart.

19. The system of claim 1, wherein the cart housing comprises a moveable stand secured to a lower surface.

20. A method for a system comprising:

a wheelchair; and a cart housing configured to be selectively secured to and removed from the wheelchair, the method comprising:

removably coupling the cart housing to the wheelchair;

operating the system as a galley cart when the cart housing is secured to the wheelchair; and operating the system as a transfer chair when the cart housing is removed from the wheelchair.

21. A vehicle comprising:

an internal cabin including a galley, wherein a cart compartment is within the galley; and a system comprising:

a wheelchair; and a cart housing removably coupled to the wheelchair, wherein the cart housing is configured to be selectively secured to and removed from the wheelchair, wherein the system is operable as a galley cart when the cart housing is secured to the wheelchair, and wherein the system is operable as a transfer chair when the cart housing is removed from the wheelchair, and wherein the system having the cart housing secured to the wheelchair is stored within the cart compartment of the galley.

* * * * *